UNITED STATES PATENT OFFICE.

EDWARD WYLAM, OF SOUTHWARK, COUNTY OF SURREY, ENGLAND.

FOOD FOR ANIMALS.

SPECIFICATION forming part of Letters Patent No. 309,503, dated December 16, 1884.

Application filed October 29, 1883. (No specimens.) Patented in England October 18, 1883, No. 4,972, and in Canada November 22, 1883, No. 18,158.

*To all whom it may concern:*

Be it known that I, EDWARD WYLAM, manufacturer, a subject of the Queen of Great Britain, and residing at Henry Street, Tooley Street, Southwark, county of Surrey, England, have invented a certain Improved Preparation of Food for Animals, Game, and Poultry, of which the following is a specification.

This invention relates to the manufacture and preparation of a new food for dogs and other animals, game, or poultry.

In explaining my invention I will state, as an example, the proportions of the various ingredients employed in the production of a mass of about twenty-four hundred-weight. For this purpose I take about twelve hundred-weight of wheat-flour, one hundred-weight of ground rice, about two hundred-weight of oatmeal, about one hundred-weight of lentil-flour, about three hundred-weight of animal matter—such, for example, as the flesh of animals—about one hundred-weight of the fruit of the date-palm, about two pounds of sulphur, about two pounds of phosphate of lime, about two pounds of a suitable preparation of iron—such, for example, as carbonate of iron—and about one-quarter of a pound of a suitable spice—such, for instance, as essence of peppermint. To the above ingredients or compound I add, in any convenient manner, as much beet-root—mangel-wurzel (*Beta vulgaris*) or the like—as will amount to about one-tenth in weight of the whole. This beet-root, having been first cleaned, is crushed, pulped, or ground in any suitable manner for the better admixture with the rest of the materials employed. These ingredients are then placed in any suitable mixing-machine, and cod-liver oil added thereto in the proportion of, say, ten gallons to the aforesaid materials—that is to say, in the proportion of about eight gallons of cod-liver oil to each ton of the other ingredients—and the whole is then mixed together, sufficient water being added to bring the mass to, say, the consistency of dough, after which the paste or dough so obtained is baked and converted into bread, cakes, or biscuits, and when so converted is ready for use.

Some of the above ingredients may be dispensed with, and the proportions of all may be varied—as, for instance, an increased quantity of oatmeal may be used, and a less proportion of lentil-flour; but in all cases the improved preparation of food is intended to contain a very considerable portion of beet-root.

I claim—

As a new composition of matter, a loaf or biscuit comprising wheat-flour, lentil-flour, oatmeal, animal matter, dates, sulphur, iron, spice, and beet-root, combined with cod-liver oil, in substantially the proportions specified.

In testimony whereof I have signed my name to this specification in the presence of two subscribing witnesses.

EDWARD WYLAM.

Witnesses:
    CHAS. JAS. JONES,
        47 *Lincoln's Inn Fields, London.*
    C. WOODROW,
        31 *Lombard St., London.*